United States Patent [19]

Rioland et al.

[11] Patent Number: 5,926,281
[45] Date of Patent: Jul. 20, 1999

[54] DEVICE TO MEASURE THE ALIGNMENT OF A LASER AMPLIFICATION SYSTEM

[75] Inventors: Jacques Rioland, Eaubonne; Michel Delon, Cernay La Ville; François-Hugues Gauthier, Voisins Le Bretonneux; Patrice Jano, Seine Port, all of France

[73] Assignee: Thomas-CSF, Paris, France

[21] Appl. No.: 08/893,180

[22] Filed: Jul. 15, 1997

[30] Foreign Application Priority Data

Jul. 23, 1996 [FR] France .................................. 96 09215
Feb. 28, 1997 [FR] France .................................. 97 02442

[51] Int. Cl.$^6$ .................................................. G01B 11/26
[52] U.S. Cl. ........................................ 356/400; 356/153
[58] Field of Search .................................... 356/400, 153; 372/101, 102, 103, 107, 108, 27

[56] References Cited

U.S. PATENT DOCUMENTS

| | | | |
|---|---|---|---|
| 4,575,849 | 3/1986 | Chun | 372/108 |
| 4,794,344 | 12/1988 | Johnson | 372/108 |
| 5,072,135 | 12/1991 | Huignard et al. . | |
| 5,173,910 | 12/1992 | Pocholle et al. . | |
| 5,259,567 | 11/1993 | Jano et al. . | |
| 5,467,193 | 11/1995 | Laewen et al. | 356/399 |
| 5,490,643 | 2/1996 | Jano et al. . | |

FOREIGN PATENT DOCUMENTS

2 723 269  2/1996  France .

*Primary Examiner*—Robert H. Kim
*Assistant Examiner*—Zandra V. Smith
*Attorney, Agent, or Firm*—Oblon, Spivak, McClelland, Maier & Neustadt, P.C.

[57] ABSTRACT

A device for the alignment of a laser beam amplification system comprises at least measuring means and alignment templates positioned instead of filtering hole plates of the amplification system, the alignment templates having holes whose centers have substantially the same spatial positions as the centers of the filtering holes, certain template holes being provided with reference sights offset in an angular way with respect to one another, the tips of these sights being pointed towards the center of the holes, the measuring means defining, by sighting at the end of the amplification system, the divergences between the focusing points of the beam in the holes, merged at a single point, and the tips of the sights, their angular positions enabling them to be assigned to their respective holes, the positions of elements of the amplification system being then controlled as a function of the measurements of divergences. Application to the automating setting of alignment, especially in the case of large numbers of parallel amplification systems.

9 Claims, 4 Drawing Sheets

DEVICE TO MEASURE THE ALIGNMENT OF A LASER AMPLIFICATION SYSTEM

BACKGROUND OF THE INVENTION

The present invention relates to a device to measure the alignment of a laser amplification system. It can be applied especially to power lasers requiring the use of several cascade-connected optical amplifiers in a multiple-passage structure.

To make a power laser, the signal prepared by a low-power laser called a pilot laser is generally amplified by means of optical amplifiers consisting, for example, of neodymium-doped glass plates associated with flash lamps. The requisite power level is obtained by the successive crossing of a large number of these plates. The association of several plates constitutes an elementary amplifier.

To optimize the extraction of the energy stored in these amplifiers, a structure known as a multiple-passage structure is used. This structure enables the beam to cross each elementary amplifier several times.

One of the techniques that may be used to obtain several passages through each amplifier is that of the spatial or angular multiplexing of the beams during the different passages. This technique, for the spatial filtering of the beam during the path between two successive amplifiers, uses the method of focusing the beam on the center of a filtering hole. The focusing points are distinct for all the paths of the system.

One of the difficulties of this technique of multiple-passage amplification is that of centering the beams in the amplifiers and in the filtering holes. The centering must be done for each laser-firing operation for it is impossible, from one firing operation to another, to ensure the stability of the optical system which gets deformed owing to mechanical and thermal constraints.

A step-by-step method cannot be envisaged when a large number of systems has to be used simultaneously as, for example, in the case of thermonuclear fusion which may require the focusing of more than 200 laser beams on a deuterium target with a size of some millimeters to transmit the desired power to this target. An automatic alignment device with high-speed performance characteristics is then needed.

SUMMARY OF THE INVENTION

The aim of the invention is to enable the making of an alignment device of this kind, providing for the centering of the beams in the amplifiers and the filtering holes of a laser system, this alignment device being particularly appropriate when a large number of laser amplifier systems have to be aligned simultaneously.

To this end, an object of the invention is a device to measure the alignment of a laser beam amplification system, wherein said device comprises at least measuring means and alignment templates positioned instead of filtering hole plates of the amplification system, the alignment templates having holes whose centers have substantially the same spatial positions as the centers of the filtering holes, certain template holes being provided with reference sights offset in an angular way with respect to one another, the tips of these sights being pointed towards the center of the holes, the measuring means defining, by sighting at the end of the amplification system, the divergences between the focusing points of the beam in the holes, merged at a single point, and the tips of the sights, their angular positions enabling them to be assigned to their respective holes, the positions of elements of the system being then controlled as a function of the measurements of divergences.

The main advantages of the invention are that it does not complicate the physical task of making the amplification system, enables easy and fast adjustment of alignment, requires few moving parts, requires only the power of the pilot laser for the alignment, is automatic and simple to implement and enables high precision.

BRIEF DESCRIPTION OF THE DRAWINGS

Other features and advantages of the invention shall appear from the following description, made with reference to the appended drawings, of which.

MORE DETAILED DESCRIPTION

Figure 1:
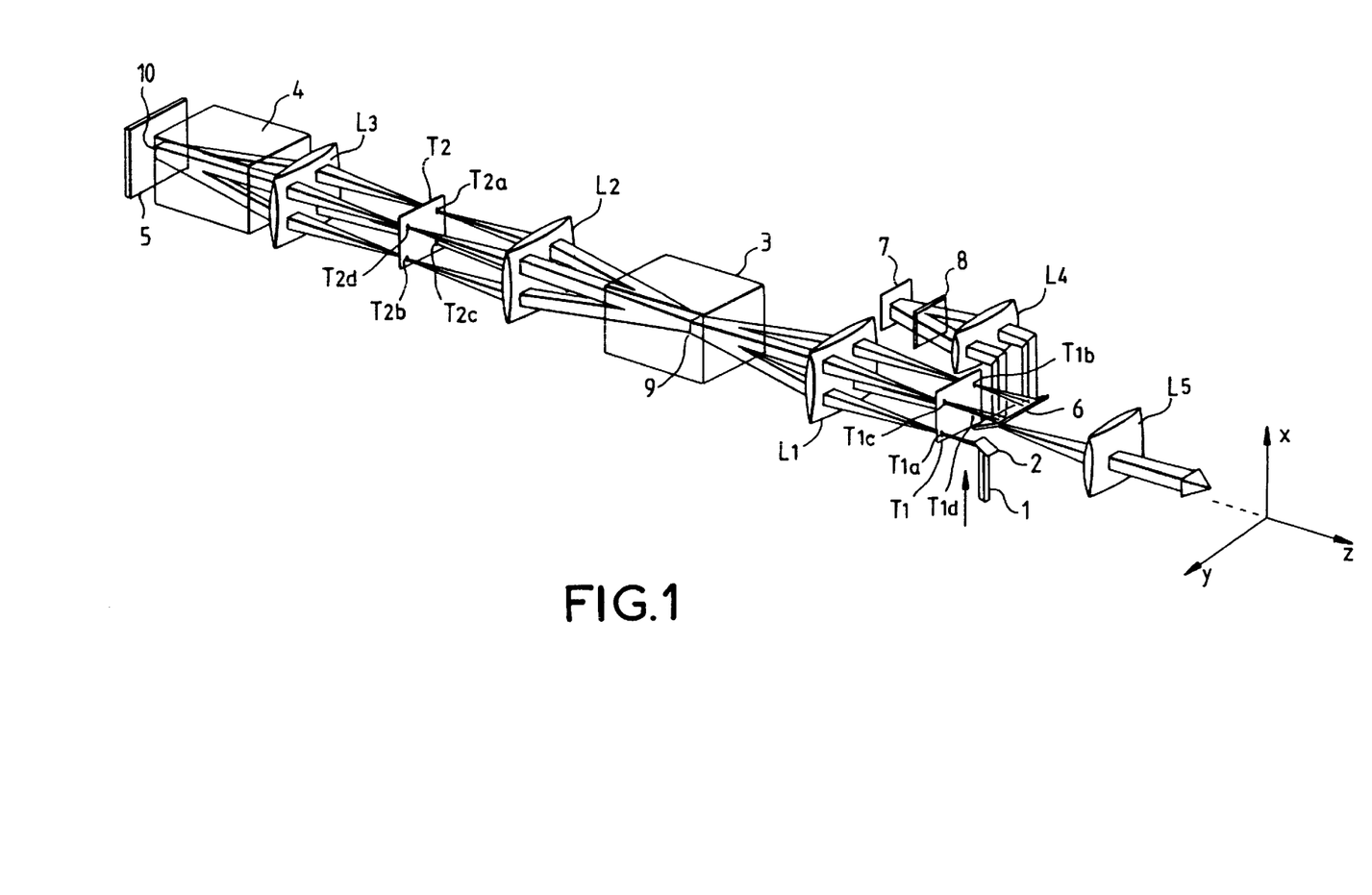
FIG. 1 shows an exemplary embodiment of an amplification system.

FIG. 1 shows an exemplary embodiment of a system with a multiple-passage structure for the amplification of a laser beam. The laser beam 1 to be amplified, called a pilot beam, is focused on the center of a first filtering hole $T1_a$ for example by means of an injection mirror 2. The filtering hole is drilled in a filtering plate T1 containing three other holes T1b, T1c, T1d.

Following the path of the beam from the first filtering hole T1a, the amplification system has a first lens L1, a first elementary amplifier 3, a second lens L2, a second filtering plate T2 drilled with four filtering holes T2a, T2b, T2c, T2d, a second elementary amplifier 4 and a first mirror 5 called a back-of-cavity mirror.

The spatial filtering done through the filtering holes associated with the lenses improves the homogeneity of the laser energy conveyed. The lenses L1, L2, L3 have focal axes that are substantially merged with one another. The plane of the filtering holes T1a, T1b, T1c, T1d of the first plate T1 is substantially perpendicular to these focal axes. This is also the case for the filtering holes of the second plate T2.

The path of the laser beam all along its amplification may be described as follows. After the first filtering hole T1a, the beam goes through the first lens L1 which makes it a parallel beam. After having crossed the first amplifier 3 and the second lens L2, the beam goes through a second filtering hole T2a, which is exactly like the first hole T1a, getting focused at its center. The beam then goes through the second amplifier 4 before being reflected with a non-zero angle of incidence in the first back-of-cavity mirror 4. A first passage into the amplifiers 3, 4 is then done.

The second passage is done in the reverse direction to the previous one, the beam passing, while getting focused, through the other filtering holes T2b, T1b. At output of the filtering hole T1b, the beam gets reflected on a U-turn mirror 6 so as to get sent to a fourth lens L4 to get reflected with a non-zero angle of incidence in a second back-of-cavity mirror 7. A Pockels cell and a polarizer 8' are, for example, interposed between this mirror and the fourth lens L4. They may also be positioned between the amplifier 4 and the mirror 5. A U-turn of the beam is thus obtained. This U-turn directs it, after reflection on the U-turn mirror 6, to another hole T1c that has not yet been crossed, in getting focused at its center. The laser beam then makes a third passage through the elementary amplifiers 3, 4 getting focused especially at the center of a hole T2c which is exactly like the previous one. After being focused on the first back-of-cavity mirror 5, the beam performs a fourth and final passage through the amplifiers 3, 4 in getting focused into two filtering holes T2d, T1d that have not yet been crossed. At output from the last filtering hole T1d, the laser beam gets repositioned as a parallel beam by means of a fifth lens L5.

The alignment of a laser amplification system of the type shown in FIG. 1 comprises at least the following two operations:

the centering of the pupils, namely the superimposition of the pupils on the back-of-cavity mirrors 5, 7;

the alignment of the focusing points and spatial filtering holes.

The length of the amplification system between the first filtering plate T1 and the first back-of-cavity mirror 5 may exceed 100 meters, an elementary amplifier 3, 4 by itself having a length for example of 15 meters.

Between two successive laser-firing operations, all the elements of the system are liable to change position, even slightly. Now it is necessary to have very great precision of the centering of the beams in the amplifiers and of the centering of the beams through the filtering holes. Since a filtering hole has a diameter of about 3 mm, the laser beam must be centered on this hole with a precision of some tens of micrometers. It is therefore imperative to correct the position of the elements of the amplification system before each laser-firing operation in order to have the desired precision in the centering operations. If we consider an orthonormal axial reference system of coordinates x, y, z where z represents the axis of the system, the corrections along this axis z may be overlooked owing to the great field depths. In its parallel part, the laser beam has for example a square section with a side of about 40 cm.

Owing to their dimensions and their weight, it is difficult, after they have been positioned, to modify the positions of the elementary amplifiers 3, 4 and of the focusing lenses L1, L2, L3, L4. It is preferable to play on the position of the mirrors 2, 5, 7 and the filtering plates T1, T2.

The optical system of an amplification system may be described, at a first approximation, by a linear mathematical model where the shifts undergone by the elements of the system appear as disturbances.

If we consider as variables of measurement the above-described divergences, in the x, y plane, between the focusing points and the centers of real desired pupils, it is possible to establish the sensitivity matrix of the outputs with respect to the disturbances. The centers of the pupils are the centering points of the beams in the amplifiers. This sensitivity matrix in particular defines the influence of all the shifts on the centering of the focusing points in the filtering holes. It corresponds to an nth order linear system of n equations with n unknown quantities where m is greater than n. In the context of an amplification system of the type described in FIG. 1, the experiments and computations made by the Applicant have shown that the linear system could for example be reduced to five linearly independent equations.

If we consider, as control variables, the angles of rotation of the swivelling mirrors 2, 5, 7 and the translation shifts along the axes x, y of the filtering plates, it is possible to establish the sensitivity matrix of the outputs with respect to these motions.

If B is the sensitivity matrix of the system with respect to the controls and if V is the vector of the errors of centering of the focal points with respect to the centers of the filtering holes, the command to be applied is represented by the vector U which is determined by the resolution of the linear system:

$$B\ U = -V \tag{1}$$

Each component of the vector U determines a command to be applied, for example a rotation of a mirror 2, 5, 7 or a shifting of a filtering plate T1, T2. The vector U is perfectly determined by the knowledge of the sensitivity matrix B and the vector V of the measurements of centering divergence. The device according to the invention makes it easy to obtain these measurements of centering divergence. The sensitivity matrix is for example preset once and for all.

For each axis x or y defined here above, the input variables of the sensitivity matrix B are for example referenced:

x L1, x L1, x L4, x T1, xT1, θ M5, θ M7, θ M2, where x L1, x L2, x L4, x T1, x T2 are respectively the translations along the axes x (or y) of the first, second and fourth lenses L1, L2, L4 and of the two filtering plates T1, T2.

θ M2, θ M5, θ M7 are respectively the rotations about the axes y or x of the injection mirror 2 and of the first and second back-of-cavity mirrors 5, 7.

The output variables of the sensitivity matrix B are:

dxT1a, dxT1b, dxT1c, dxT1d, dxT2a, dxT2b, dxT2c, dxT2d which represent the translations along the axis x (or y) of the filtering holes of the two plates T1, T2.

Since the sensitivity matrix B is for example a fifth ranking matrix, it may be reduced to a fifth-order matrix. It may then be inverted and five input variables are then necessary to resolve the system.

These input variables are actually the measurements of the divergences of centering of the focusing points of the beams with respect to the centers of five filtering holes of the total of eight, drilled in the two plates T1, T2.

Five commands are chosen so as to obtain a reduced fifth-order matrix B'.

If V' designates the vector consisting of the above-mentioned measurements of divergence and U' the vector consisting of the five commands, the command B' to be applied to the system to obtain the centering of the focusing points in the filtering holes is given by the following relationship:

$$U' = (B'^{-1})(-V') \tag{2}$$

where $B'^{-1}$ is the reverse matrix of the reduced matrix.

This reverse matrix $B'^{-1}$ may be stored in a computer which computes the relationship (2) here above for each alignment on the basis of the vector of measurements V'.

The matrix B' is determined from the optical model of the amplifier system.

Figure 2:
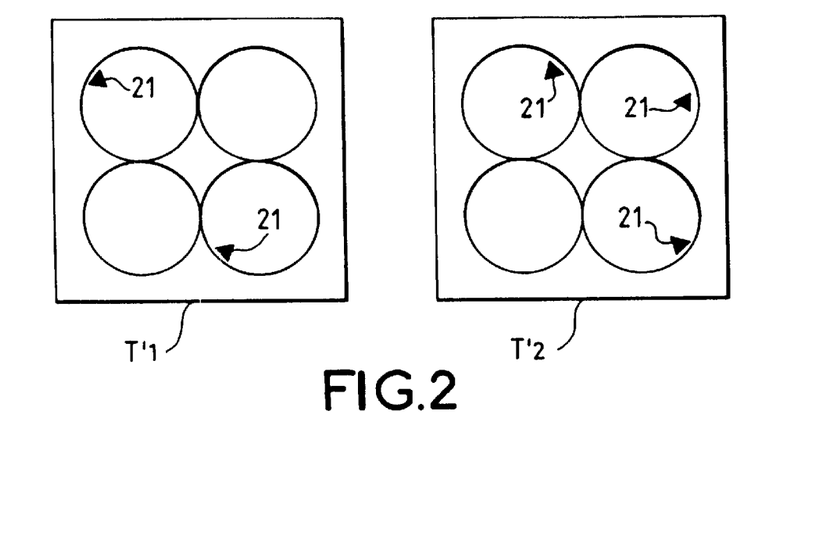
FIG. 2 shows exemplary embodiments of alignment templates used in the device according to the invention.

FIG. 2 shows a possible embodiment of means of measurement of the divergences of centering of the focusing points of the beam with respect to the centers of the filtering holes, namely in fact the means for the measurement of the vector V'.

This vector V' is measured by replacing the filtering hole plates by alignment templates T'1, T'2 shown in FIG. 2. A first alignment template T'1 is positioned instead of the first filtering hole plate T1. A second template T'2 is positioned instead of the second filtering hole plate T2. The templates T'1, T'2 consist of plates drilled with holes having a diameter greater than or equal to those of the real filtering plates, the centers of the holes having substantially the same spatial positions. Each hole is equipped with at most one aiming sight 21 whose tip is pointed towards the center of the hole. The total number of sights distributed among the holes is equal to the number of measurements of the vector V', for example five measurements in the case of a system as illustrated in FIG. 1. Indeed, the total number of sights is equal to the rank of the sensitivity matrix B of the system. The positions of the sights are offset in an angular way so that all the sights are visible through a sighting operation at the end of the amplification system. For example, two holes of the first template T'1 respectively have a sight positioned at 7 o'clock and 11 o'clock, the other two holes having no sight. Three holes of the second template T'2 are fitted out with sights positioned respectively at 1 o'clock, 3 o'clock and 5 o'clock, one hole having no sight. The sights 21 may be distributed evenly.

Figure 3:
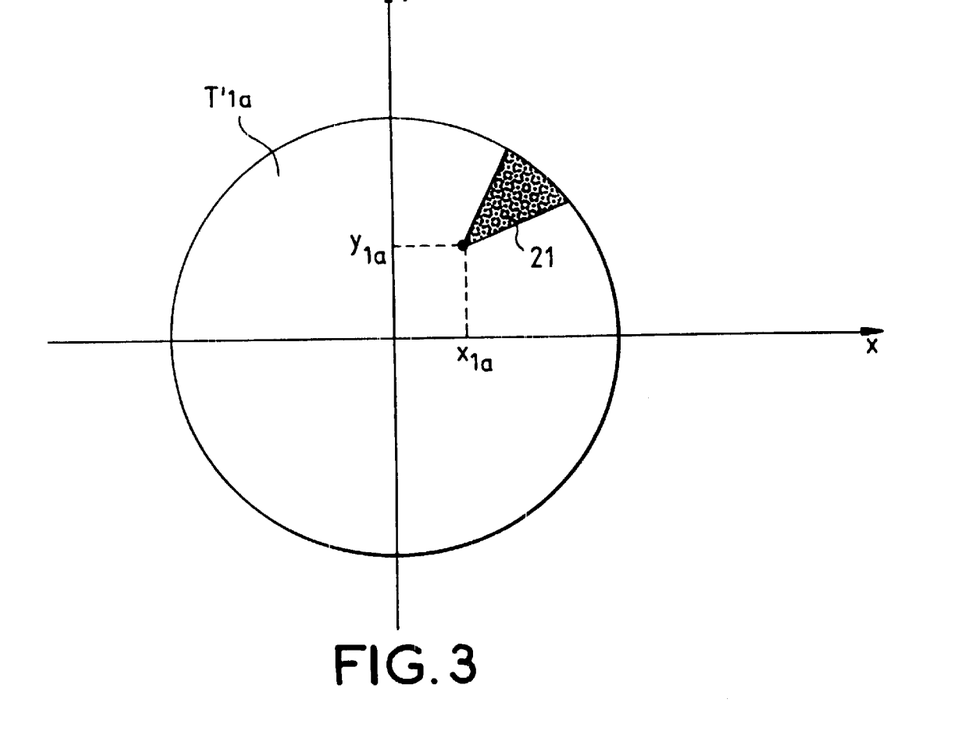
FIG. 3 shows the tip of a sight of an alignment template identified in a plane.

FIG. 3 shows that the coordinates x1a, y1a of the tip of the sight 21 of a hole T'1a may be defined in the plane x, y hence especially with respect to the center 0a of the corresponding filtering hole. The measurement of the position of the focusing points with respect to the tips of the sights thus makes it possible to define the measurement of the divergences of these focusing points with the centers of the filtering holes. Since the system is for example a fifth order system, five measurements of divergence and five commands only are needed to correct the system.

The vector measured V' is for example the following:

$$V'=(dxT'1c, dxT'1d, dxT'2b, dxT'2c, dxT'2d)$$

The components of this vector are the divergences in the plane x, y of the focusing points of the beam with respect to the center of the holes T'1c, T'1d, T'2b, T'2c, T'2d of the templates T'1, T'2, fitted out with sights 21.

Since n is the rank of the sensitivity matrix B, n commands are chosen so as to obtain an nth order reduced sensitivity matrix B'. In the example pertaining to FIG. 1, n is equal to 5. Thus, the command vector U' may be the following:

$$U'=(xT1, xT2, \theta M5, \theta M7, \theta M2)$$

This means in particular that it is enough to set the position in translation in the plane x, y of the filtering plates T1, T2 and the rotational position about the axes x and y of the mirrors 2, 5, 7 to adjust the centering of the focusing points in the filtering holes. This adjustment is obtained from the measurements of the differences V' by the relationship (2) $U'=(B^{-1})(-V')$, this computation being done for example by a computer.

The measurements of divergences are made by using FIG. 2. For this purpose, the filtering hole plates T1, T2 are replaced by the templates T'1, T'2 fitted out with five reference sights. Through end-of-system sighting operations, measurement means are used to determine the divergence between the focusing points of the beam, merged at a single point at the measurement means, and the tips of the five sights. The angular position of the sights also enables the measured differences to be assigned to their respective holes. With the divergence from the tip of a sight being known, it is then immediately possible, by taking the difference, to obtain the divergence from the center since the position of the tip is perfectly defined with respect to this center.

Figure 4:
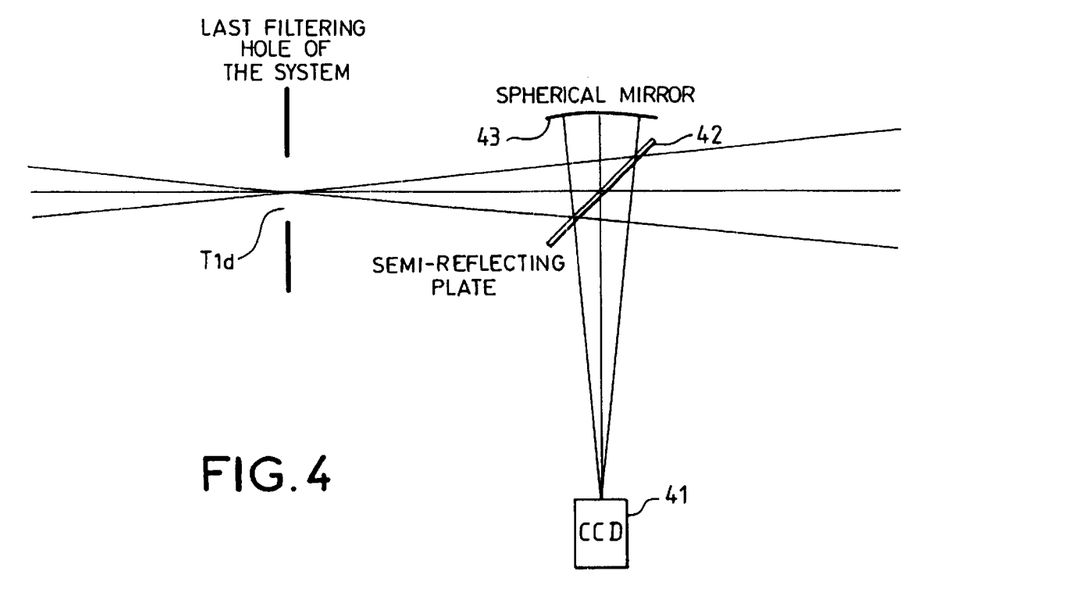
FIG. 4 shows a possible embodiment of means of divergence of the centering of focusing points.

FIG. 4 shows a possible embodiment to measure these differences. With the filtering holes, in fact the template holes, being for example illuminated by an ancillary beam, the sighting is done by means of a camera (41) for example a CCD high-resolution infrared camera observing the last point of convergence at output T'1d from the amplification system. The image of the sights is recorded by the camera and their positions in the image are for example determined by digital processing of the image. The angular position of the sights enables them to be assigned to their respective holes and thus makes it possible to determine the divergences of centering with respect to these holes. The beam at output from the system, namely from the last filtering hole T1d, there gets reflected on a semi-reflecting plate 42 and then on a spherical mirror 43 to get focused on the matrix detector.

These measurement means, for example, give a computer the vector V' of the measurements of centering divergence. With the sensitivity matrix of the system being known, especially with its reverse matrix being memorized, the computer can then resolve the linear system and determine the vector U' to command actuators controlling, for example, the position of the templates T'1, T'2 and of the injection mirrors 2 and the back-of-cavity mirrors 5, 7.

The procedure of alignment developed from the measurement given by the device according to the invention may then be reiterated to ascertain that the system is properly aligned. Once this alignment is done, the filtering hole plates T1, T2 are then made to replace the alignment templates T'1, T'2 with a positioning of greater precision than the tolerated error, for example 5 μm.

Before undertaking the previous alignment procedure, it may be necessary to see to the centering of the pupils. To this end, the injection pupil at input of the amplification system should be positioned so that its successive images through the system are centered in the middle of the path in the elementary amplifiers 3, 4, namely on the back-of-cavity mirrors 5, 7 and the U-turn mirror 6. For this purpose, the focal distances and the positioning of the lenses are such that the successive images of the input pupils are on these mirrors.

Figure 5:
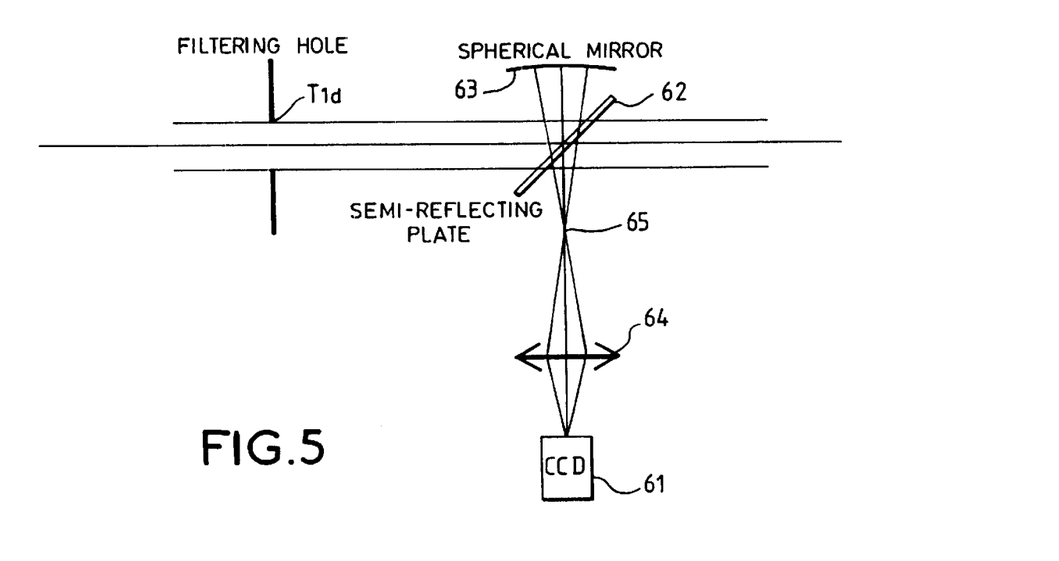
FIG. 5 shows a possible embodiment to measure the divergence of pupil centering.

FIG. 5 shows a possible embodiment to obtain the centering of the pupils. A camera 61 fitted out with an optical system focused at the focal point of the spherical mirror 63 and placed so as to be facing the last focusing point is used to display the position of the different pupils. Reticules centered in the desired positions are placed in the planes of these pupils, and it is enough to align them by means of the display camera 61 in positioning the injection pupil by means of the injection mirror 2. The optical system focused at infinity is for example formed by a semi-reflecting mirror 62, a spherical mirror 63 and a lens 64. The beam at output of the amplifier system is reflected partly on the semi-reflecting mirror 62 and then on the spherical mirror 63 which sends a focused beam back to its focal point 62. The lens 64 forms the image of the this point on the camera 61. The assembly of FIG. 5 may be associated with that of FIG. 4. The camera 61 is then connected to the computer and the injection mirror controlled by the actuator assembly, which receives the control values from the computer. The alignment measuring device according to the invention can be applied to the simultaneous setting of a large number of amplification systems especially through its automatic operation and high-speed performance. It uses a limited number of moving parts, for example a few mirrors and a few alignment templates. It enables the beams to be kept at the center of the filtering holes with a precision of greater than 5% of the diameter of the holes. It also makes it possible to maintain the centering and orientation of the beam, in the pupils, with a precision greater than 1% of the aperture. The alignment measuring device uses only the power of the pilot laser 1, independently of the size of the filtering holes.

Figure 6:
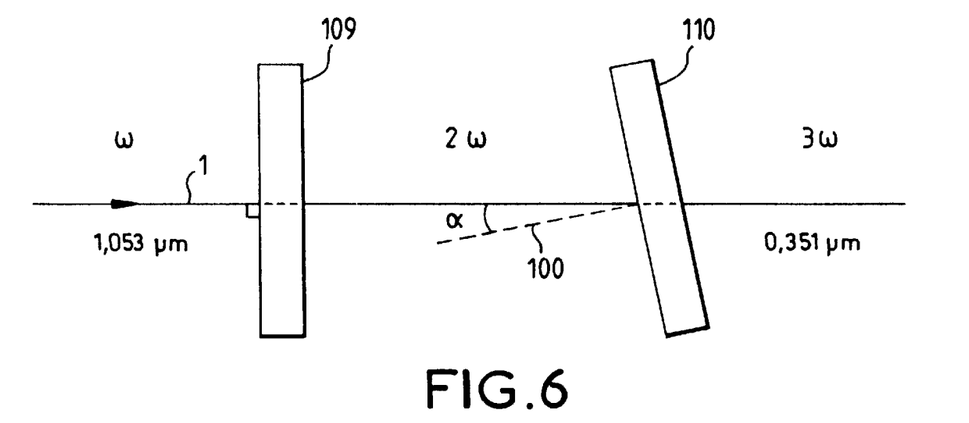
FIG. 6 illustrates the passage of a laser beam through non-linear crystals.

The fifth lens L5 at output of the system may for example be followed by two non-linear crystals 109, 110 as shown in FIG. 6. These two crystals 109, 110 in particular are aimed at making the amplified beam pass from the infrared range to the ultraviolet range, namely for example from a wavelength of 1.053 $\mu$m to 0.351 $\mu$m. These non-linear crystals are, for example, crystals known as KDP, which refers to their chemical formula $kH_2 PO_4$.

So as not to lose energy in a significant way, the beam must enter the first non-linear crystal 109 perpendicularly to its surface. The beam must also enter the second non-linear crystal 110 almost perpendicularly to its surface. By way of an indication, to allow 95% of the incident energy go through the first crystal 109, the beam must enter this crystal perpendicularly to within ±50 $\mu$rad.

FIG. 6 illustrates the passage of the laser beam 1 through the non-linear crystals 109, 110. The direction of the incident beam 1 should be as perpendicular as possible to the surface of the first crystal 109. At output of this crystal, the frequency is 2 $\omega$. Again to optimize the conversion efficiency, the beam must enter the second crystal 110 in forming a non-zero angle $\alpha$ with its normal 100, this angle $\alpha$ being for example equal to about 250 $\mu$rad. At output of the second crystal 110, the frequency is 3 $\omega$. The input frequency of the laser beam being 1.053 $\mu$m, at output of the crystals 109, 110, the wavelength of the main beam is truly equal to 0.351 $\mu$m but there remains a residue at 1.053 $\mu$m that must be eliminated. The target of the amplified laser beam should be penetrated, for example, only by the ultraviolet, at the wavelength of 0.351 $\mu$m. This residue is for example deflected from the target by a separator.

Figure 7:
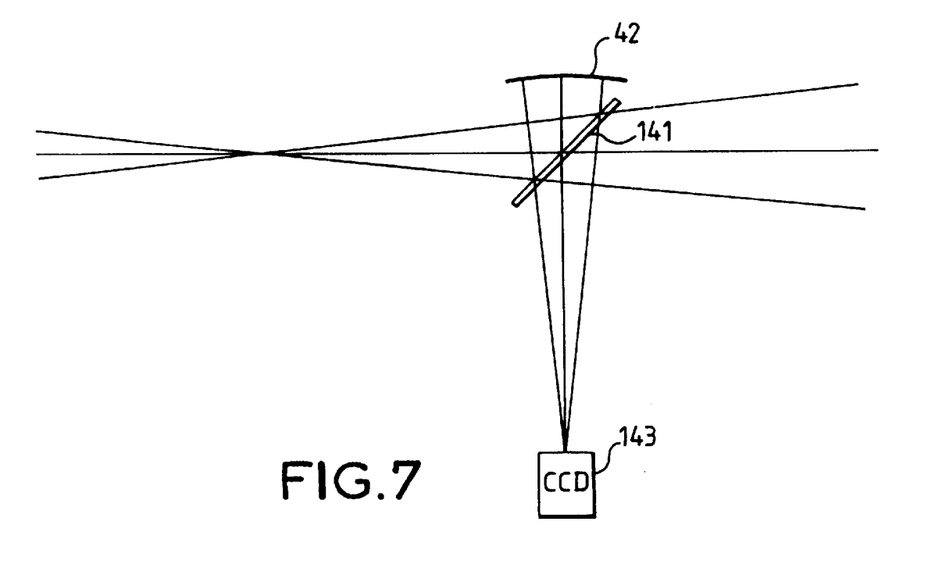
FIG. 7 illustrates means used to ascertain that the beam has entered the above-mentioned crystals in a given direction.

FIG. 7 shows the means used to ascertain that the beam truly enters the non-linear crystals 109, 110 in the desired direction, in particular perpendicularly to the surface for the first crystal and at a divergence of 250 $\mu$rad for the second crystal, this being done to optimize the conversion efficiency. A setting of the orientation of the crystals 109, 110 may therefore be necessary before each operation of firing on the target. For this purpose, a self-collimation device as shown in FIG. 7 may be used. A semi-reflecting plate 141 positioned at output of the amplification system and a spherical mirror 142 are used for the identification, on CCD (charge-coupled device) type infrared detectors 143, of the directions of the optical axes of the laser beam at output of the amplifier system and of the beam reflected by one of the conversion crystals 109, 110, a small part of the beam being reflected on these crystals. The first crystal 109 is thus oriented by self-collimation and then the second 110 is shifted by 250 $\mu$rad in the desired direction.

The alignment device according to the invention has been described for the setting of a system of the type shown in FIG. 1. It may be adapted to other types of systems modelled by linear systems of any rank. In particular, the number of sights used may be advantageously equal to the rank of the linear system associated with the laser amplification system.

What is claimed is:

1. A device to measure the alignment of a laser beam amplification system including removable filtering hole plates defining filtering holes, comprising:

alignment templates positioned at locations corresponding to locations of removed filtering hole plates of the amplification system, the alignment templates having template holes whose centers have substantially the same spatial positions as centers of the filtering holes, a plurality of said template holes being provided with reference sights offset in an angular way with respect to one another, tips of said reference sights being pointed towards the center of the template holes, at least one measuring device configured to measure, at an end of the amplification system, divergences between focusing points of the laser beam in the template holes, merged at a single point at a location of the measuring device, and the tips of the reference sights, and a control device configured to control elements of the amplification system based the divergences measured by the measuring device;

wherein angular positions of said reference sights enable the reference sights to be assigned to their respective template holes.

2. A device according to claim 1, wherein:

the amplification system is modelled by a linear system of n equations, the total number of reference sights being equal to n, and the measurement device performing n measurements of divergence.

3. A device according to claim 1, wherein the measurement device comprises:

a camera configured to observe the laser beam at a last focusing point, a semi-reflecting plate configured to reflect the laser beam at an output of the amplification system, and a spherical mirror configured to reflect the laser beam reflected from the semi-reflecting plate and to focus the laser beam onto the camera at the last focusing point.

4. A device according to claim 1, further comprising:

reticles placed in planes of pupils of the amplification system, and a camera configured to display positions of the pupils of the amplification system, the camera having an optical system focused at infinity and placed in a position facing a last focusing point of the amplification system, wherein the display by the camera of the pupils positions enables a centering of the pupils.

5. A device according to claim 4, further comprising:

a semi-reflecting mirror configured to reflect the laser beam at an output of the amplification system, a spherical mirror configured to reflect the laser beam reflected from said semi-reflecting mirror, and a lens configured to focus the laser beam reflected from the spherical mirror and onto the camera.

6. A device according to claim 1, further comprising:

a semi-reflecting plate positioned at an output of the amplification system and configured to reflect at least part of the laser beam, and a spherical mirror configured to focus the beam reflected from said semi-reflecting plate onto infrared detectors, wherein the infrared detectors are configured to identify a direction of an optical axes of the laser beam so as to orient by self-collimation an angle at which the laser beam enters at least one of a plurality of conversion crystals included in the amplification system.

7. A method of controlling an alignment of a laser beam amplification system having removable filtering hole plates defining filtering holes, comprising the steps of:

placing alignment templates having template holes so that each center of said template holes is positioned at substantially a same spatial position as a center of the filtering holes defined by the removed filtering hole plates;

providing reference sights to said template holes, said reference sights being offset in an angular way with respect to one another;

illuminating said alignment templates with the laser beam;

measuring divergences between focusing points of the laser beam in the template holes and tips of the reference sights;

assigning the reference sights to their respective template holes using the reference sights angular offsets; and controlling positions of elements of the amplification system as a function of measurements of divergences performed in the measuring step.

8. The method according to claim 7, further comprising:

modeling the amplification system with a linear system of n equations;

repeating the measuring step n times so as to obtain n measurements of divergence; and solving the linear system of n equations based on said n measurements.

9. A method according to claim 7, further comprising:

focusing at infinity an optical system of a camera; and placing the optical system in a position facing a last focusing point on the amplification system;

centering pupils of the amplification system based on information received by the optical system.

* * * * *

UNITED STATES PATENT AND TRADEMARK OFFICE
CERTIFICATE OF CORRECTION

PATENT NO. : 5,926,281
DATED : July 20, 1999
INVENTOR(S) : Jacques RIOLAND, et al.

It is certified that error appears in the above-identified patent and that said Letters Patent is hereby corrected as shown below:

On the title page, item [73], the assignee's name should be:

--Thomson-CSF --

Signed and Sealed this

Sixth Day of June, 2000

*Attest:*

Q. TODD DICKINSON

*Attesting Officer*          *Director of Patents and Trademarks*